(12) United States Patent
Kim

(10) Patent No.: US 7,268,999 B2
(45) Date of Patent: Sep. 11, 2007

(54) DISPLAY APPARATUS

(75) Inventor: Kwey-hyun Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/832,357

(22) Filed: Apr. 27, 2004

(65) Prior Publication Data

US 2005/0023418 A1    Feb. 3, 2005

(30) Foreign Application Priority Data

Aug. 1, 2003    (KR) .................... 10-2003-0053376

(51) Int. Cl.
G06F 1/16    (2006.01)
(52) U.S. Cl. .................. 361/681; 248/371; 248/919
(58) Field of Classification Search ............ 248/917, 248/919, 371, 370, 121; 361/682, 681
See application file for complete search history.

(56) References Cited

U.S. PATENT DOCUMENTS

| | | | | |
|---|---|---|---|---|
| 5,978,211 A * | 11/1999 | Hong | .................. | 361/683 |
| 6,018,847 A | 2/2000 | Lu | .................. | 16/337 |
| 6,216,989 B1 * | 4/2001 | Shioya et al. | .................. | 248/122.1 |
| 6,217,137 B1 | 4/2001 | Bitbaba et al. | .................. | 312/223.1 |
| 6,502,792 B1 | 1/2003 | Cho et al. | .................. | 248/121 |
| 6,712,321 B1 * | 3/2004 | Su et al. | .................. | 248/123.11 |
| D517,551 S * | 3/2006 | Kim et al. | .................. | D14/375 |
| 2003/0075649 A1* | 4/2003 | Jeong et al. | .................. | 248/157 |
| 2004/0217244 A1* | 11/2004 | Wu et al. | .................. | 248/278.1 |

FOREIGN PATENT DOCUMENTS

| | | |
|---|---|---|
| JP | 2000-206893 | 7/2000 |
| JP | 2001-75486 | 3/2001 |
| JP | 2003-29653 | 1/2003 |
| KR | 2001-38547 | 5/2001 |
| KR | 20-247968 | 9/2001 |
| KR | 2002-14399 | 2/2002 |
| KR | 2002-27798 | 4/2002 |
| KR | 20-288328 | 8/2002 |
| KR | 20-295979 | 11/2002 |

* cited by examiner

Primary Examiner—Ramon O Ramirez
(74) Attorney, Agent, or Firm—Staas & Halsey LLP

(57) ABSTRACT

A display apparatus including a display part and a stand part supporting the display part. The stand part includes a non-conductive supporting stand; a connection member, to which electromagnetic waves are induced, coupled to the display part and the supporting stand; and an electromagnetic wave induction bracket removably mounted to the supporting stand; wherein the electromagnetic wave induction bracket induces the electromagnetic waves from the connection member by contacting the connection member.

16 Claims, 7 Drawing Sheets

DISPLAY APPARATUS

CROSS-REFERENCE TO RELATED APPLICATIONS

This application claims the benefit of Korean Patent Application No. 2003-53376, filed Aug. 1, 2003 in the Korean Intellectual Property Office, the disclosure of which is incorporated herein by reference.

BACKGROUND OF THE INVENTION

1. Field of the Invention

The present invention relates to a display apparatus, and, more particularly, a display apparatus efficiently blocking unwanted electromagnetic waves radiated from electric and electronic components in a display part by using a stand part.

2. Description of the Related Art

In general, a display apparatus may include various devices displaying data in a visual form, such as a letter or an image, on a screen.

An LCD (Liquid Crystal Display) is a flat-plate type display apparatus. The use of the LCD is becoming more widespread due to the variety of applications for which it is well suited, such as a computer monitor, a TV, etc. These applications are causing a rapidly rising demand for LCDs. With such an explosive demand for this display apparatus, a technology of blocking EMI (Electromagnetic Interference) caused by unwanted electromagnetic waves from the computer monitor or the TV has also been actively developed.

As shown in FIG. 1, a conventional display apparatus comprises a display part 2; a stand part 4 connected to the display part 2 and divided into a stand main body 3a, a stand cover 3b, and a connection member 3c; and a bracket frame 6 disposed in the stand part 4 and reinforcing the stand part 4. In such a display apparatus, unwanted electromagnetic waves can be efficiently blocked if the unwanted electromagnetic waves are induced to the connection member 3c disposed at an upper part of the stand part 4, or if the unwanted electromagnetic waves are induced to a bottom part of the stand part 4 through the connection member 3c.

However, most of the stand part 4 of the display apparatus is designed to block the unwanted electromagnetic waves by inducing the unwanted electromagnetic waves to the bottom part of the stand part 4 through the bracket frame 6, which is formed of conductive material. This decreases blocking efficiency if applied to the display part 2 which is blocking the unwanted electromagnetic waves efficiently by inducing the unwanted electromagnetic waves to the upper part of the stand part 4. Also, the blocking efficiency is decreased if the bracket frame 6 is formed of a non-conductive material, and it is applied to the display part 2 which is blocking the unwanted electromagnetic waves efficiently by inducing the unwanted electromagnetic waves to the bottom part of the stand part 4.

On the other hand, even though the bracket frame 6 is detachably combined in the stand part 4, the main role of the bracket frame 6 is reinforcing the stand part 4, therefore the stand part 4 is comparatively not strong enough to reinforce the display part 2 by itself if the bracket frame 6 is removed from the stand part 4.

Therefore, different types of stand parts are required to be applied, depending on the type of the display part, to increase blocking efficiency to unwanted electromagnetic waves, thereby increasing manufacturing cost.

SUMMARY OF THE INVENTION

Accordingly, it is an aspect of the present invention to provide a display apparatus to block unwanted electromagnetic waves efficiently depending on the type of the display apparatus.

Additional aspects and/or advantages of the invention will be set forth in part in the description which follows and, in part, will be obvious from the description, or may be earned by practice of the invention.

The foregoing and/or other aspects of the present invention are achieved by providing a display apparatus comprising a display part and a stand part supporting the display part, and the stand part comprises a non-conductive supporting stand; a connection member, to which electromagnetic waves are induced, coupled to the display part and the supporting stand, and an electromagnetic wave induction bracket removably mounted to the supporting stand, wherein the electromagnetic wave induction bracket induces the electromagnetic waves from the connection member by contacting the connection member.

According to an aspect of the present invention, the supporting stand may comprise a stand base provided such that the connection member contacts the electromagnetic wave induction bracket; a stand bracket detachably coupled to a bottom of the stand base and supporting the electromagnetic wave induction bracket; and a stand cover coupled to the stand base.

According to an aspect of the present invention, the stand bracket may be coupled to the stand base by a screw.

According to an aspect of the present invention, the electromagnetic wave induction bracket may be coupled to the stand bracket by a screw.

According to an aspect of the present invention, the stand base may comprise a first accommodating part; a second accommodating part; and a partition wall separating the first accommodating part and the second accommodating part; wherein the connection member and the electromagnetic wave induction bracket are coupled together by a screw, and the connection member and the electromagnetic wave induction bracket are provided in the first accommodating part and the second accommodating part, respectively.

According to an aspect of the present invention, the partition wall may be formed with a first screw hole, and the connection member and the electromagnetic wave induction bracket may respectively have a second screw hole and a third screw hole formed corresponding to the first screw hole.

According to an aspect of the present invention, the connection member may comprise a hinge structure.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
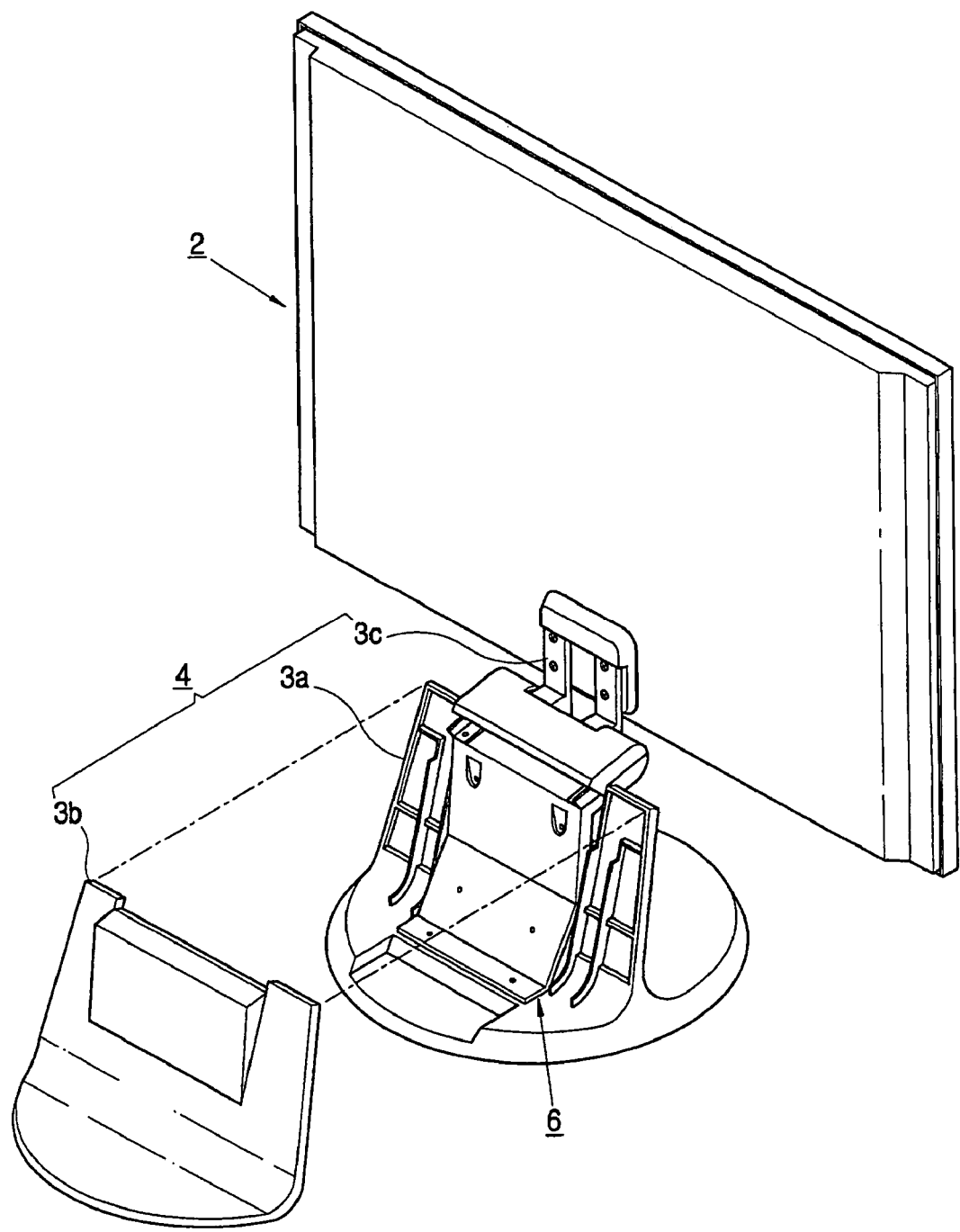
FIG. 1 is a perspective view of a rear part of a conventional display apparatus.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
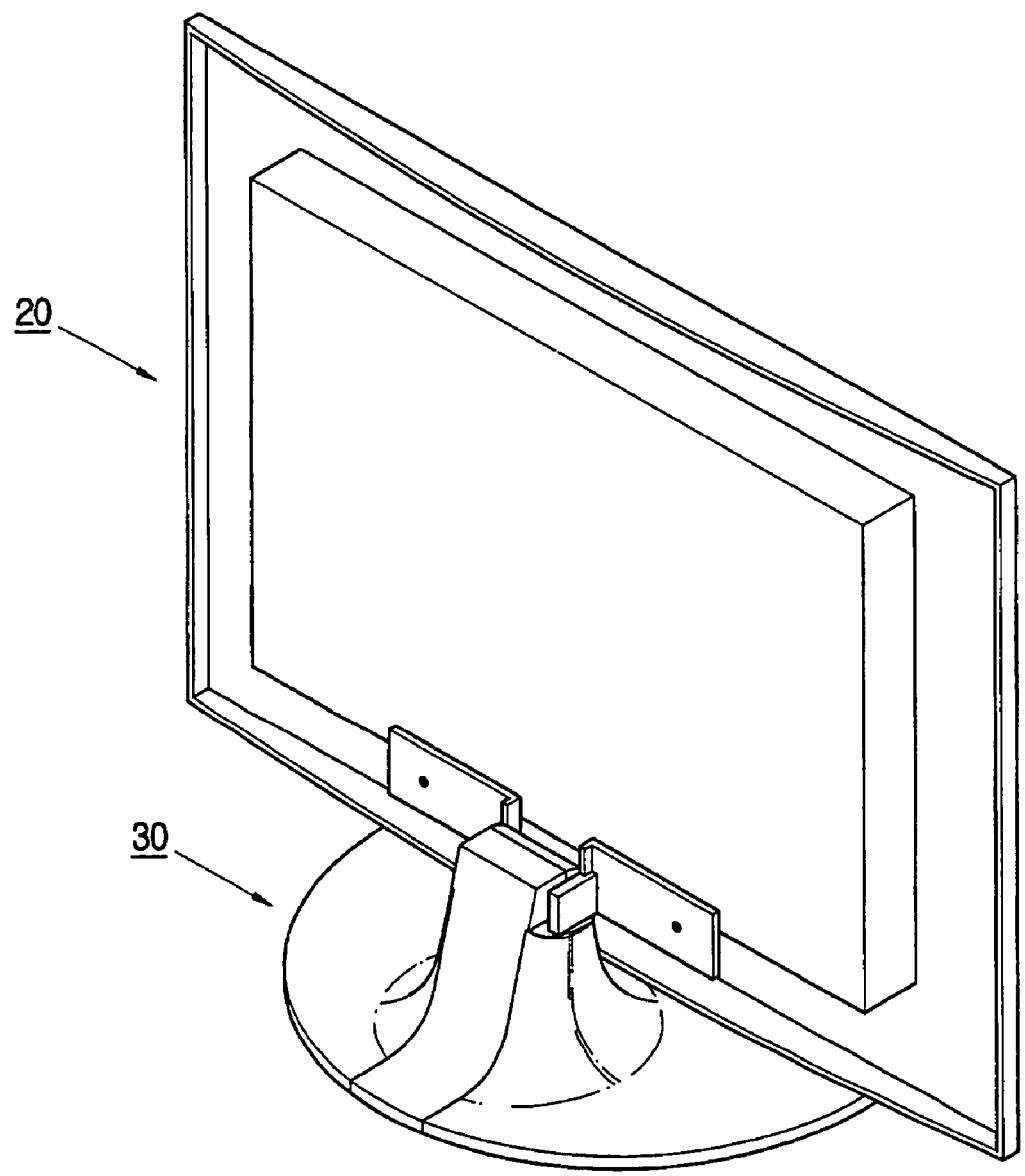
FIG. 2 is a perspective view of a display apparatus according to an embodiment of the present invention.
Figure 3:
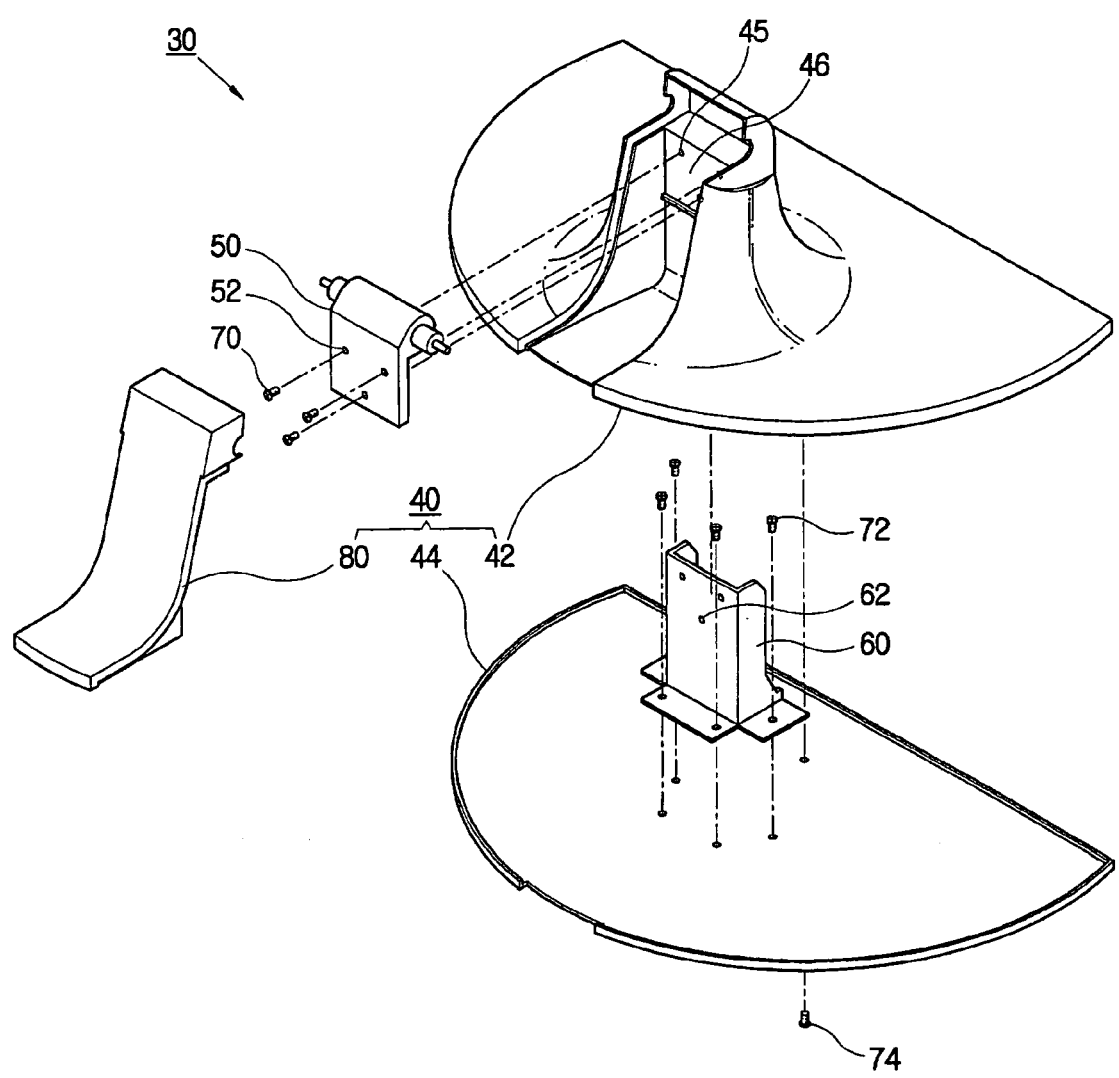
FIG. 3 is an exploded perspective view of a stand part of the display apparatus according to the embodiment of the present invention shown in FIG. 2.
Figure 4A:
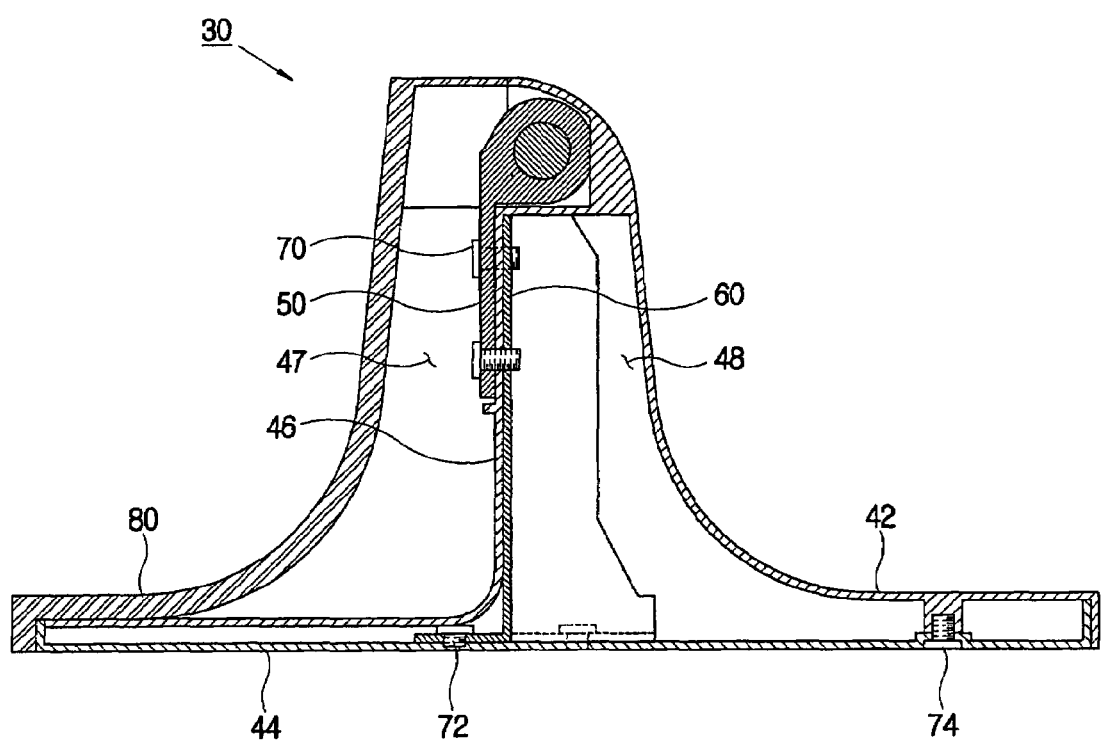
FIGS. 4A and 4B illustrate an electromagnetic wave induction bracket attached to and detached from the stand part of the display apparatus according to two embodiments of the present invention.
Figure 4B:
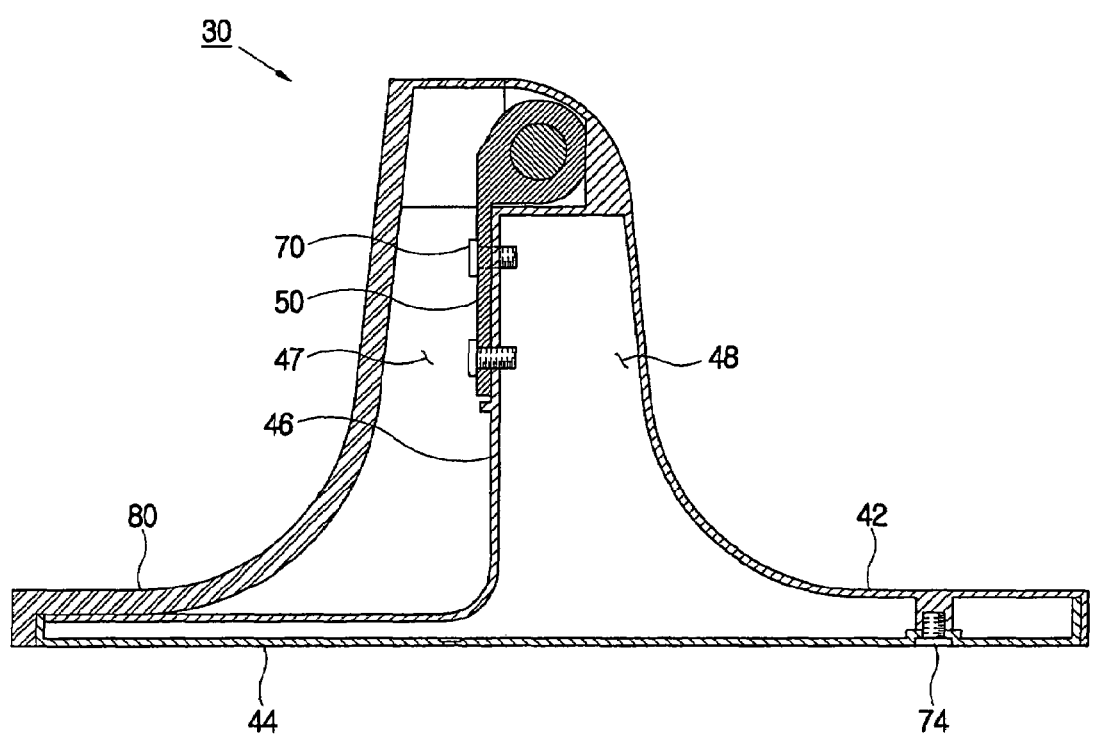
Figure 5A:
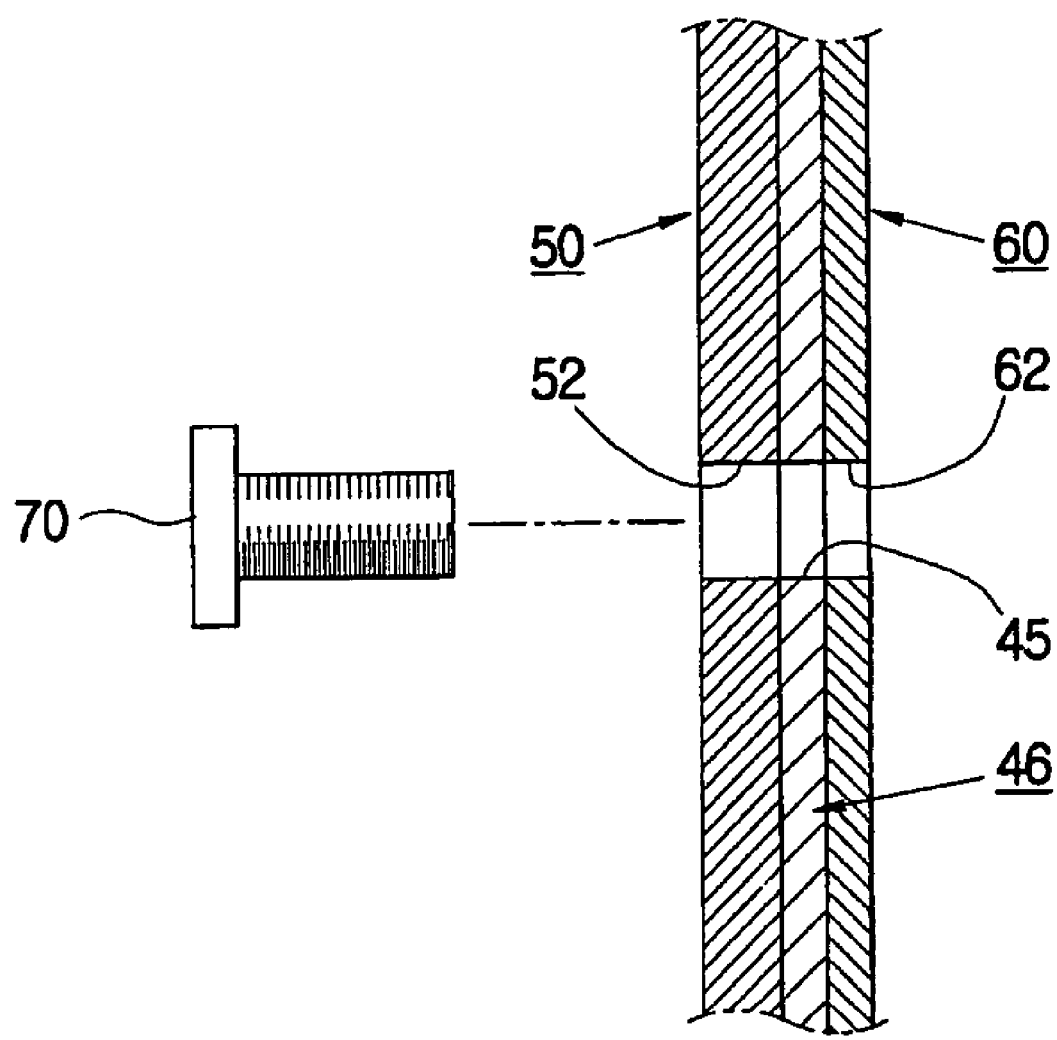
FIGS. 5A and 5B illustrate a combination structure of the stand part of the display apparatus according to the embodiments of the present invention shown in FIGS. 4A and 4B.
Figure 5B:
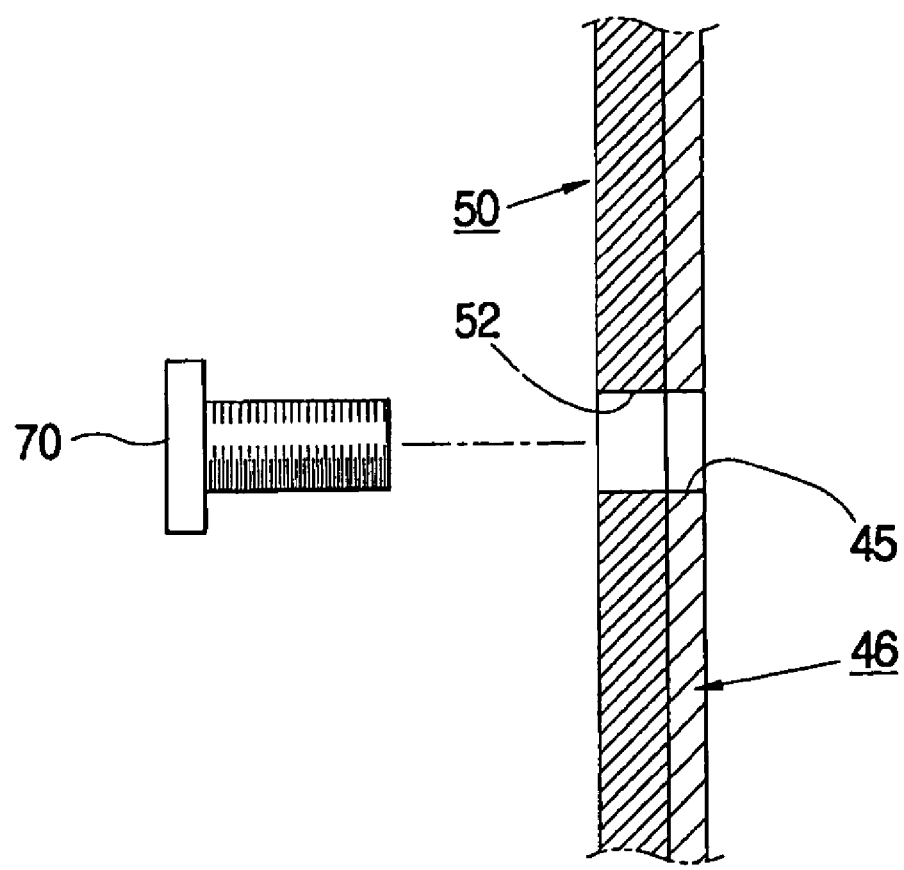

FIG. 2 is a perspective view of a display apparatus according to an embodiment of the present invention; FIG. 3 is an exploded perspective view of a stand part of the display apparatus according to the embodiment of the present invention shown in FIG. 2; FIGS. 4A and 4B illustrate an electromagnetic wave induction bracket attached to and detached from the stand part of the display apparatus according to two embodiments of the present invention; and FIGS. 5A and 5B illustrate a combination structure of the stand part of the display apparatus according to the embodiments of the present invention shown in FIGS. 4A and 4B.

As shown in the drawings, the display apparatus according to an embodiment of the present invention comprises a display part 20, displaying visual images, and a stand part 30, supporting the display part 20, which is coupled to a bottom part of the display part 20.

The display part 20 is designed to block unwanted electromagnetic waves radiated from electric and electronic components in the display part 20 by inducing the unwanted electromagnetic waves to the stand part 30, and different types of the display part 20 cause different types of unwanted electromagnetic waves. The unwanted electromagnetic waves cause electromagnetic interference (EMI).

The stand part 30 comprises a supporting stand 40; a connection member 50 coupled to the display part 20 and the supporting stand 40, and receiving the unwanted electromagnetic waves induced to the connection member 50 from the display part 20; and an electromagnetic induction bracket 60 selectively mounted to the supporting stand 40, and inducing the unwanted electromagnetic waves from the connection member 50. The induction bracket 60 has a side contacted to the connection member 50 when the electromagnetic induction bracket 60 is attached in the supporting stand 40.

The supporting stand 40 is made of a non-conductive material, so as to block the unwanted electromagnetic waves from the connection member 50, and is strong enough structurally to support the display part 20 without an additional reinforce member. Also, the supporting stand 40 is designed to be coupled to the connection member 50, and can be modified in a various manner so long as the electromagnetic wave induction bracket 60 is selectively mounted thereto. The supporting stand 40 preferably, but not necessarily, comprises a stand base 42 coupling the connection member 50 and the electromagnetic wave induction bracket 60 so as to allow a side of the connection member 50 and a side of the electromagnetic wave induction bracket 60 to contact each other; a stand bracket 44 detachably coupled to a bottom part of the stand base 42 and supporting the electromagnetic wave induction bracket 60; and a stand cover 80 coupled to the stand base 42.

The stand base 42 preferably, but not necessarily, includes a first accommodating part 47 and a second accommodating part 48 formed divided by a partition wall 46. The connection member 50 and the electromagnetic wave induction bracket 60 are respectively accommodated in the first accommodating part 47 and the second accommodating part 48, and coupled by a screw 70 so as to allow a side of the connection member 50 and a side of the electromagnetic wave induction bracket 60 to contact the partition wall 46. The number of screws 70 used may vary, and other coupling methods can be alternatively applied to couple the connection member 50 and the electromagnetic wave induction bracket 60, with or without the screw 70.

A first screw hole 45 is provided in the partition wall 46, and a second screw hole 52 and a third screw hole 62 are provided in the connection member 50 and the electromagnetic wave induction bracket 60 respectively, and thus the connection member 50 and the electromagnetic wave induction bracket 60 are coupled together by the screw 70.

A screw 74 is provided to couple the stand bracket 44 to the stand base 42. Various detachable coupling methods can be applied to couple the stand bracket 44 to the stand base 42, but the screw 74 is preferred because it provides a simple and effective coupling operation. Also, a screw 72 is provided to couple the stand bracket 44 to, and thus provide support for, the electromagnetic wave induction bracket 60.

The stand cover 80 covers a combination part of the connection member 50 and the electromagnetic wave induction bracket 60, so that the combination part is not exposed to the outside.

The connection member 50 is made of a conductive material so as to conduct the unwanted electromagnetic waves from the display part 20. The structure of the connection member 50 can be varied if required, but preferably has a hinge structure allowing the display part 20 to rotate.

The electromagnetic wave induction bracket 60 is made of a conductive material so as to conduct the unwanted electromagnetic waves from the connection member 50. The electromagnetic wave induction bracket 60 is contacted to, or separated from, the connection member 50 by being selectively mounted to the second accommodating part 48 of the supporting stand 40 to block the unwanted electromagnetic waves depending on the type of the display part 20. That is, the stand part 30 without the electromagnetic wave induction bracket 60 is applied if the blocking efficiency is increased when the unwanted electromagnetic waves are induced only to the connection member 50, whereas the stand part 30 with the electromagnetic wave induction bracket 60 is applied if blocking efficiency is increased when the unwanted electromagnetic waves are induced to a bottom of the supporting stand 40 through the electromagnetic wave induction bracket 60.

Also, the electromagnetic wave induction bracket 60 can be coupled to the second accommodating part 48 of the stand base 42 without being supported by the stand bracket 44, and its size and shape are changeable if required.

As described above, the present invention provides a display apparatus having an electromagnetic wave induction bracket selectively mounted to a stand part, thereby efficiently blocking unwanted electromagnetic waves.

Therefore, the display apparatus has increased functionality compared with a conventional display apparatus.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A display apparatus, comprising:
    a display part; and
    a stand part supporting the display part, the stand part comprising:
        a non-conductive supporting stand,
        a connection member, to which electromagnetic waves are induced, coupled to the display part and the non-conductive supporting stand, and
        an electromagnetic wave induction bracket removably mounted to the non-conductive supporting stand,
    wherein the electromagnetic wave induction bracket induces the electromagnetic waves from the connection member by directly contacting the connection member, and
    the non-conductive supporting stand comprises a stand base provided such that the connection member contacts the electromagnetic wave induction bracket, a stand bracket detachably coupled to a bottom of the stand base and supporting the electromagnetic wave induction bracket, and a stand cover coupled to the stand base.

2. The display apparatus according to claim 1, wherein a size and/or shape of the electromagnetic wave induction bracket are changeable.

3. The display apparatus according to claim 1, wherein the stand bracket is coupled to the stand base by a screw.

4. The display apparatus according to claim 1, wherein the electromagnetic wave induction bracket is coupled to the stand bracket by a screw.

5. The display apparatus according to claim 3, wherein the electromagnetic wave induction bracket is coupled to the stand bracket by a screw.

6. The display apparatus according to claim 1, wherein the stand base comprises:
    a first accommodating part;
    a second accommodating part; and
    a partition wall separating the first accommodating part and the second accommodating part;
    wherein the connection member and the electromagnetic wave induction bracket are coupled together by a screw, and the connection member and the electromagnetic wave induction bracket are provided in the first accommodating part and the second accommodating part, respectively.

7. The display apparatus according to claim 6, wherein the partition wall is formed with a first screw hole, and the connection member and the electromagnetic wave induction bracket respectively have a second screw hole and a third screw hole formed corresponding to the first screw hole.

8. The display apparatus according to claim 1, wherein the connection member comprises a hinge structure.

9. The display apparatus according to claim 1, wherein the stand base comprises:
    a first accommodating part;
    a second accommodating part; and
    a partition wall separating the first accommodating part and the second accommodating part;
    wherein the connection member and the electromagnetic wave induction bracket are coupled together, and
    the connection member and the electromagnetic wave induction bracket are provided in the first accommodating part and the second accommodating part, respectively.

10. The display apparatus according to claim 9, wherein the stand part covers a coupling part of the connection member and the electromagnetic wave induction bracket so that the coupling part is not exposed to an area outside the non-conductive supporting stand.

11. The display apparatus according to claim 1, wherein the non-conductive supporting stand, including the connection member, supports the display apparatus.

12. A display apparatus, comprising:
    a display part; and
    a stand cart supporting the display part, the stand part comprising:
        a non-conductive supporting stand,
        a connection member, to which electromagnetic waves are induced, coupled to the display part and the non-conductive supporting stand, and
        an electromagnetic wave induction bracket removably mounted to the nonconductive supporting stand,
    wherein the electromagnetic wave induction bracket induces the electromagnetic waves from the connection member by directly contacting the connection member, and the electromagnetic wave induction bracket comprises a conductive material.

13. A display apparatus, comprising:
    a display part; and
    a stand part supporting the display part, the stand part comprising:
        a non-conductive supporting stand,
        a connection member, to which electromagnetic waves are induced, coupled to the display part and the non-conductive supporting stand, and
        an electromagnetic wave induction bracket removably mounted to the non-conductive supporting stand,
    wherein the electromagnetic wave induction bracket induces the electromagnetic waves from the connection member by directly contacting the connection member, and
    the connection member comprises a conductive material.

14. A display apparatus, comprising:
    a display part; and
    a stand part supporting the display part, the stand part comprising:
        a non-conductive supporting stand,
        a connection member, to which electromagnetic waves are induced, coupled to the display part and the non-conductive supporting stand, and
        an electromagnetic wave induction bracket removably mounted to the non-conductive supporting stand,
    wherein the electromagnetic wave induction bracket induces the electromagnetic waves from the connection member by directly contacting the connection member, and
    the non-conductive supporting stand comprises a stand base provided such that the connection member contacts the electromagnetic wave induction bracket, a stand bracket detachably coupled to a bottom of the stand base, and a stand cover coupled to the stand base.

15. The display apparatus according to claim 14, wherein the stand base comprises:
- a first accommodating part;
- a second accommodating part; and
- a partition wall separating the first accommodating part and the second accommodating part;
- wherein the connection member and the electromagnetic wave induction bracket are coupled together, and the connection member and the electromagnetic wave induction bracket are provided in the first accommodating part and the second accommodating part, respectively.

16. The display apparatus according to claim 15, wherein the electromagnetic wave induction bracket is coupled to and supported by the second accommodating part of the stand base.

* * * * *

UNITED STATES PATENT AND TRADEMARK OFFICE
CERTIFICATE OF CORRECTION

| | | |
|---|---|---|
| PATENT NO. | : 7,268,999 B2 | Page 1 of 1 |
| APPLICATION NO. | : 10/832357 | |
| DATED | : September 11, 2007 | |
| INVENTOR(S) | : Kwey-hyun Kim | |

It is certified that error appears in the above-identified patent and that said Letters Patent is hereby corrected as shown below:

Column 6, Line 20, change "cart" to --part--.

Signed and Sealed this

Fourth Day of March, 2008

JON W. DUDAS
*Director of the United States Patent and Trademark Office*